UNITED STATES PATENT OFFICE.

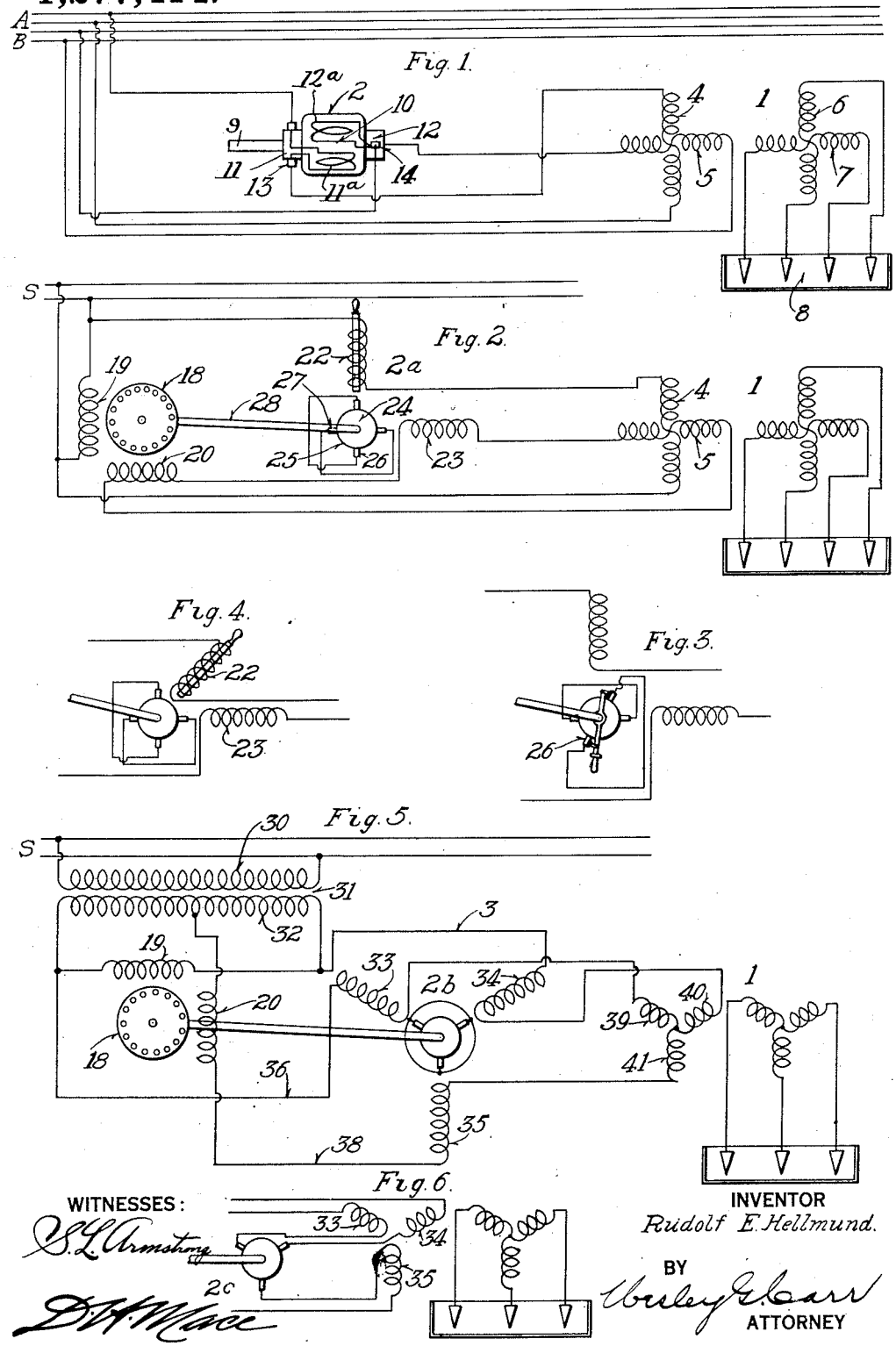

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION AND CONTROL.

1,277,414.   Specification of Letters Patent.   Patented Sept. 3, 1918.

Application filed January 23, 1915. Serial No. 3,916.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Distribution and Control, of which the following is a specification.

My invention relates to alternating-current systems of distribution and to the control or regulation of polyphase induction motors that receive energy therefrom.

One of the objects of my invention is to provide a system of the above indicated character which shall embody simple and effective means for automatically increasing the voltage supplied to each phase of a polyphase motor in accordance with the increase of the motor load, whereby a high power factor may be obtained during operation at light loads, while the increased voltages at heavy load result in a relatively high motor torque.

In another aspect, it is an object of my invention to provide a system in which a polyphase induction motor is supplied with energy from a single-phase source through the agency of a polyphase converter and to provide adequate means for varying the voltages of the several phases of the induction motor in accordance with load conditions and also for compensating for the distortion in phase position of the converter voltage, whereby high motor torques and balanced load conditions are secured when the motor is operating under load.

According to my present invention, I employ an auxiliary polyphase dynamo-electric machine or booster in which the voltages of its respective phases are mutually dependent upon one another, and, in order to boost the voltages supplied to the several phases of the induction motor, I connect the several phases of the auxiliary booster in series circuit with the respective phases of the induction motor.

Broadly considered, my invention is independent of the nature of the polyphase source of energy, although, in certain of its modifications, it is of peculiar adaptability in maintaining balanced operating conditions in distributing systems of that type wherein a polyphase circuit is energized from a single-phase circuit, a phase-converting dynamo-electric machine participating in the energy transfer, as will hereinafter be more fully described.

In the accompanying drawing, Figure 1 is a diagrammatic view of a system of distribution and regulation embodying my invention; Fig. 2 is a similar view of a modified system of my invention; Figs. 3 and 4 are diagrammatic views of modifications of the circuit connections of the polyphase booster shown in Fig. 2; Fig. 5 is a diagrammatic view of a modified system embodying three-phase apparatus; and Fig. 6 is a further modification of a portion of a system embodying my invention.

Referring to Fig. 1, a polyphase source of alternating-current energy A and B is adapted to supply energy to a polyphase induction motor 1 through the medium of an auxiliary polyphase dynamo-electric machine or booster 2. As shown, all of the apparatus is of the two-phase type, although my invention is not so restricted, as will hereinafter be set forth.

The induction motor 1 may be of any well-known construction of the wound-rotor class, and comprises primary phase windings 4 and 5 and secondary phase windings 6 and 7. The several sets of phase windings referred to are disposed in quadrature relation, the secondary windings 6 and 7 being connected to an adjustable resistor 8 which may conveniently take the form of a liquid rheostat for governing the acceleration of the motor, and the primary set of windings 4 and 5 being connected to the respective phases A and B of the source of energy through the booster 2.

The auxiliary polyphase booster 2 is driven, as a generator, in any suitable manner, for example, by an electric motor (not shown) which is secured to a shaft 9. The booster embodies an armature 10 having a plurality of independent commutators 11 and 12 to which independent armature windings 11ª and 12ª are connected, said windings being disposed in such relation, the one with the other, that the voltages generated therein and delivered by the quadrature-related brushes are in substantially 90° relationship. The commutator 11 is provided with a plurality of brushes 13, while a plurality of brushes 14 are employed in connection with commutator 12. The booster 2 is of the well-known Leblanc type, which, while it embodies a magnetizable stationary core structure (not shown), is provided with no field windings whatsoever.

One phase of the booster 2, namely, the armature winding associated with the commutator 11, is connected in series circuit with the motor phase winding 4, while the phase winding 5 of the motor is similarly connected in a series circuit which includes the other phase of the booster 2, namely, the armature winding associated with commutator 12.

Under conditions of operation, the several phases of the booster 2 are traversed by the load currents of the respective phase windings 4 and 5 of the motor 1, and, by reason of the peculiar characteristics of this type of machine, the voltages generated by the several phases thereof are mutually dependent upon each other and upon the load currents traversing said phases. For instance, the load current which traverses one phase of the machine produces a field which, in turn, induces a voltage in the other phase by rotation, and vice versa. If, therefore, the proper direction of rotation is chosen, the induced voltages in the several phases of the booster 2 are vectorially added to the voltages of the phases A and B of the source of energy, whereby the motor voltages are concurrently increased in accordance and modified in phase with increases in the motor load, which results in high motor torques under load conditions, while permitting operation at good power factors at light loads. Obviously, the degree of boosting effected by the machine 2 may be fixed by proper design to any desired amount or, in fact, the booster 2 may be used merely to compensate for the drop in line voltage under load conditions.

Reference may now be had to Fig. 2, in which a single-phase source of energy S is connected to the primary phase windings 4 and 5 of the motor 1 through a phase converter 18 and a polyphase booster 2ª.

The phase converter 18 may conveniently be of the induction squirrel-cage-rotor type and embodies a plurality of phase windings 19 and 20 that are electro-magnetically related and are disposed in quadrature relation. The winding 19 is the exciting winding and is connected across the single-phase source S, while winding 20 is the secondary winding and is adapted to generate a voltage that is displaced 90° in phase with respect to that of the source.

The polyphase booster 2ª comprises a commutator-type machine and embodies a plurality of phase field windings 22 and 23 disposed at substantially 90° from each other, and an armature 24 having a commutator 25 and a plurality of sets of brushes 26 and 27 that are independently short-circuited to provide a machine of the repulsion class. The phase winding 22 is connected in series with the primary phase winding 4 of the motor 1 across the source of energy S, while the phase winding 23 thereof is connected in series-circuit relation with the phase winding 5 of the motor 1 across the converter secondary winding 20.

The armature 24 of the booster 2ª may be mechanically associated with the rotor of the phase converter 18 by means of a shaft 28 or may be driven in any other suitable manner.

Assuming the system to be in operation, the load currents of the several phases 4 and 5 of the motor 1 traverse the respective phase windings 22 and 23 of the booster 2ª, and, in so doing, mutually act, the one upon the other, to effect concurrent changes in the booster voltages that are supplied to the motor 1 in accordance with variations in the motor load. Moreover, with this type of booster and arrangement of circuit connections, it is not only possible to uniformly raise the voltages of the respective motor phases, but it is also possible to influence one phase to a greater degree than the other, whereby there is a tendency to overcome any unbalancing or distortion in the phase converter. For instance, if the load current of one phase is in excess of that of the other, this phase will produce a stronger field for the other which will result in a correspondingly increased induced voltage therein, which, in turn, reacts to increase the current therein.

In case the tendency for unbalancing in the phase converter is strong, it is possible to provide special means for effecting the compensations referred to, and in Fig. 3 I have illustrated, in a simple manner, one means which is effective and reliable to accomplish the desired result, while permitting, at the same time, uniform variation in the voltages of the separate phases. In Fig. 3, the short-circuited brushes 26 are made adjustable so that they may be shifted from their normal positions in order to cause the booster to effect the compensations for unbalancing of the converter phase loads, as set forth.

In Fig. 4, another suitable means for correcting the unbalancing and distortion of phases is shown, which merely involves the electrical shifting of the position of one of the field windings 22 with respect to the other field winding 23. This may be accomplished mechanically by actually changing the position of the field winding 22 or the machine may be designed with the field winding slightly displaced in order to meet and compensate the normal distortion under the service conditions for which the apparatus is intended.

Reference may now be had to Fig. 5 in which the single-phase source S delivers energy to a primary winding 30 of a transformer 31 having a secondary winding 32 to which the phase converter 18 is connected. In this case, the exciting winding 19 is connected across the transformer winding 32, while the secondary winding 30 is connected to substantially the midpoint thereof in the manner of the well-known Scott or T connection. Thus, three phase voltages are produced and delivered to the respective phase windings 33, 34 and 35 of a polyphase booster 2$^b$ of the short-circuited-armature commutator type, through the respective conductors 36, 37 and 38. The other terminals of the booster phase windings 33, 34 and 35 are electrically connected to the respective phase windings 39, 40 and 41 of the motor 1. With the connections as set forth, the polyphase booster 2$^b$ serves to increase the voltage supplied to the several phases of the driving motor 1 in accordance with increases in the load thereof, as will be understood.

Another means for accomplishing the desired result, when three-phase apparatus is employed, is shown in Fig. 6, in which a three-phase commutator booster 2$^c$ of the Leblanc type, such as that described in connection with Fig. 1, is employed and is connected in the star point of the windings 33, 34 and 35 of the motor 1. Thus, voltages displaced in phase by substantially 120° are added to the corresponding voltages of the phase windings of the motor 1 in proportion to the increases of load current of said motor, whence provisions are made for high motor torques under load conditions.

Obviously, other modifications in the apparatus and circuit connections herein shown and described may be made without departing from the spirit and scope of my invention, and such modifications are intended to be covered by the appended claims.

I claim as my invention:

1. In a converting system, the combination with a polyphase source of current subject to voltage unbalance in a varying degree with varying degrees of load, of a load circuit connected thereto, and a boosting dynamo-electric machine inserted between said source and said circuit, and provided with series-excited field windings inserted in the respective mains, said boosting dynamo-electric machine being so constructed and arranged that, by virtue of said field excitation, a polyphase electromotive force is produced therein of such magnitude and degree of unbalance as, when combined with the electromotive force of said source, produces a substantially balanced polyphase electromotive force in said load circuit.

2. In a control system, the combination with a single-phase source of alternating-current energy, a polyphase converter and a polyphase electric motor adapted to receive energy from said converter, of a polyphase dynamo-electric machine electrically connected in circuit with said converter and said motor for concurrently controlling the voltages supplied to all the phases of said motor, and means for compensating for unbalanced load conditions upon said converter.

3. In a control system, the combination with a polyphase source of energy, and a polyphase induction motor adapted to be operated therefrom, of a polyphase commutator alternating-current dynamo-electric machine having a plurality of phase field windings, an armature winding and brushes and connections short-circuiting said armature winding substantially in alinement with said phase-windings, respectively, said field windings being severally connected in circuit with the respective phase windings of said polyphase motor for effecting changes in the motor voltages in accordance with changes of load.

4. In a control system, the combination with a polyphase source of energy, and a polyphase induction motor adapted to be operated therefrom, of a polyphase commutator alternating-current dynamo-electric machine having a plurality of phase field windings, an armature winding and brushes and connections short-circuiting said armature winding in substantial alinement with said phase-windings, respectively, and means permitting relative angular movement between the commutator brushes and the axes of the said field windings, said field windings being severally connected in circuit with the respective phase windings of said polyphase motor for effecting changes in the motor voltages in accordance with changes of load.

In testimony whereof, I have hereunto subscribed my name this 21st day of Jan., 1915.

RUDOLF E. HELLMUND.

Witnesses:
J. V. DOBSON,
B. B. HINES.